US012480678B2

United States Patent
Kuriyama

(10) Patent No.: US 12,480,678 B2
(45) Date of Patent: Nov. 25, 2025

(54) EQUIPMENT STATE MONITORING DEVICE AND EQUIPMENT STATE MONITORING METHOD

(71) Applicant: Mitsubishi Electric Corporation, Tokyo (JP)

(72) Inventor: Toshiyuki Kuriyama, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 427 days.

(21) Appl. No.: 18/296,025

(22) Filed: Apr. 5, 2023

(65) Prior Publication Data

US 2023/0235909 A1 Jul. 27, 2023

Related U.S. Application Data

(63) Continuation of application No. PCT/JP2020/048073, filed on Dec. 23, 2020.

(51) Int. Cl.
G06F 11/30 (2006.01)
F24F 11/49 (2018.01)
G01M 99/00 (2011.01)

(52) U.S. Cl.
CPC ........... *F24F 11/49* (2018.01); *G01M 99/005* (2013.01)

(58) Field of Classification Search
CPC ..................................... F24F 11/49
See application file for complete search history.

(56) References Cited

U.S. PATENT DOCUMENTS

| | | | | |
|---|---|---|---|---|
| 2001/0005821 A1* | 6/2001 | Ottosson | ............ | G05B 23/0235 702/182 |
| 2007/0100623 A1* | 5/2007 | Hentschel | .......... | G01N 29/4445 704/256.8 |
| 2022/0099323 A1 | 3/2022 | Kuriyama | | |

FOREIGN PATENT DOCUMENTS

| | | |
|---|---|---|
| DE | 699 10 800 T2 | 6/2004 |
| DE | 10 2004 023 824 A1 | 12/2005 |
| DE | 11 2019 007 470 T5 | 3/2022 |
| EP | 0 775 335 B1 | 8/1998 |
| JP | 2015-92121 A | 5/2015 |
| JP | 2015092121 A * | 5/2015 |

OTHER PUBLICATIONS

German Office Action for German Application No. 112020007671.7, dated Nov. 15, 2023, with an English translation.

* cited by examiner

*Primary Examiner* — Phuong Huynh
(74) *Attorney, Agent, or Firm* — Birch, Stewart, Kolasch & Birch, LLP

(57) ABSTRACT

An equipment state monitoring device projects a plurality of pieces of actual measurement data indicating a state value of equipment to a dimensionless space in which a plurality of display shapes indicating a respective plurality of pieces of normal information indicating a normal state of the equipment are represented by a common shape, and estimates a distribution of a state of the equipment on the basis of the plurality of pieces of actual measurement data projected to the dimensionless space. Further, both or one of the normal information in the dimensionless space and the actual measurement data in the dimensionless space is corrected on the basis of the relationship between actual measurement data indicating the normal state of the equipment in the dimensionless space and the display shape indicating the normal information in the dimensionless space.

9 Claims, 11 Drawing Sheets

EQUIPMENT STATE MONITORING DEVICE AND EQUIPMENT STATE MONITORING METHOD

CROSS REFERENCE TO RELATED APPLICATIONS

This application is a continuation of PCT International Application No. PCT/JP2020/048073, filed on Dec. 23, 2020, all of which is hereby expressly incorporated by reference into the present application.

TECHNICAL FIELD

The present disclosure relates to an equipment state monitoring device and an equipment state monitoring method for monitoring a state of equipment.

BACKGROUND ART

As a conventional technique for monitoring a state of equipment, for example, there is a method for determining a maintenance timing of a vehicle air conditioner described in Patent Literature 1. In this method, the difference between the specific enthalpy at the start of compression and the specific enthalpy at the end of compression by the outdoor heat exchanger is compared with a first set value and a second set value larger than the first set value, and when the difference in the specific enthalpy is larger than the second set value, it is determined that the air conditioner requires maintenance.

On the other hand, when the difference in the specific enthalpy is larger than the first set value and smaller than the second set value, a refrigeration cycle diagram of a Mollier diagram (hereinafter, described as a p-h (pressure-specific enthalpy) diagram) is created on the basis of sensor data detected by various sensors provided in the outdoor heat exchanger. The refrigeration cycle diagram is displayed together with a refrigeration cycle diagram in a normal state of the air conditioner.

In the p-h diagram, when the shape of the refrigeration cycle diagram has changed from that corresponding to the normal state, it can be determined that the performance of the air conditioner has deteriorated. When the difference in shape exceeds a set value, it is determined that the air conditioner requires maintenance. Note that the refrigeration cycle diagram in the normal state of the air conditioner is a display shape of normal information indicating the normal state of the equipment, and the sensor data used to create the refrigeration cycle diagram is actual measurement data on the state value of the equipment.

CITATION LIST

Patent Literature

Patent Literature 1: JP 2015-92121 A

SUMMARY OF INVENTION

Technical Problem

The shape of the refrigeration cycle diagram of the p-h diagram of the air conditioner varies depending on the outside air temperature even when the set temperature of the air conditioner is the same. Therefore, the refrigeration cycle diagram in the normal state of the air conditioner has a different shape depending on the outside air temperature. In addition, the refrigeration cycle diagram to be compared with the refrigeration cycle diagram in the normal state of the air conditioner is so-called instantaneous data created on the basis of the sensor data detected at the start of the maintenance timing determination.

The method described in Patent Literature 1 monitors whether or not a state of equipment indicated by instantaneous data is a normal state to determine necessity of maintenance of the equipment. Therefore, when an outlier incidentally occurs in the instantaneous data, there is a possibility that the state of the equipment is erroneously recognized. The impact of accidental outliers in the sensor data can be mitigated on the basis of a change trend in the state of the equipment specified using a plurality of pieces of sensor data sequentially detected within a certain period of time (e.g., one month).

However, when the external environment of the equipment changes or the use method of the equipment is changed within the certain period of time, the normal state of the equipment varies according to these changes. As a result, the normal information of the equipment is represented by a large number of display shapes having different shapes according to variations in the normal state of the equipment. For this reason, there is a problem that it is difficult to understand a correspondence relationship between the plurality of pieces of sensor data and the normal information represented by a large number of display shapes, and therefore the state of the equipment cannot be accurately recognized.

Furthermore, in the method described in Patent Literature 1, normal information (For example, a refrigeration cycle diagram in a normal operation state of the air conditioner) for each operation state of the air conditioner is set using a physical model that simulates the physical state of the air conditioner. Since the physical model simulates the physical state of the equipment operating in the ideal operation environment set in advance, the normal information of the equipment operating in the ideal operation environment is calculated by using the physical model.

Since the ideal operation environment of the equipment is generally different from the actual operation environment of the equipment, an error occurs between the normal information of the equipment in the actual operation environment and the normal information assuming the ideal operation environment of the equipment. For this reason, a deviation corresponding to the error exists between the sensor data detected from the equipment in the actual operation environment and the normal information assuming the ideal operation environment of the equipment. Therefore, there is a problem that the state of the equipment cannot be accurately recognized if these are compared.

The present disclosure solves the above problem, and an object thereof is to obtain an equipment state monitoring device and an equipment state monitoring method capable of accurately recognizing a state of equipment.

Solution to Problem

An equipment state monitoring device according to the present disclosure includes: processing circuitry to acquire pieces of actual measurement data each indicating a state value of equipment; to acquire pieces of normal information each indicating a normal state of the equipment; to acquire a positional relationship of each of the pieces of the actual measurement data in a corresponding one of display shapes indicating the respective pieces of the normal information of the equipment; to project each of the pieces of the actual measurement data to a dimensionless space on the basis of the positional relationship between a corresponding one of the display shapes indicating the respective pieces of the normal information and a corresponding one of the pieces of the actual measurement data, the dimensionless space being a space in which the display shapes indicating the respective pieces of the normal information of the equipment are represented by a common shape; to correct both or one of the normal information in the dimensionless space and the actual measurement data in the dimensionless space on the basis of a relationship between actual measurement data indicating the normal state of the equipment in the dimensionless space and a display shape indicating the normal information in the dimensionless space; and to estimate a distribution of a state of the equipment on the basis of the pieces of the actual measurement data projected to the dimensionless space.

Advantageous Effects of Invention

According to the present disclosure, the pieces of the actual measurement data each indicating the state value of the equipment are projected to the dimensionless space in which the display shapes indicating the respective pieces of the normal information each indicating the normal state of the equipment are represented by the common shape, and the distribution of the state of the equipment is estimated on the basis of the pieces of the actual measurement data projected to the dimensionless space. Further, both or one of the normal information in the dimensionless space and the actual measurement data in the dimensionless space is corrected on the basis of the relationship between the actual measurement data indicating the normal state of the equipment in the dimensionless space and the display shape indicating the normal information in the dimensionless space. As a result, the equipment state monitoring device according to the present disclosure can accurately recognize the state of the equipment.

DESCRIPTION OF EMBODIMENTS

First Embodiment

Figure 1:
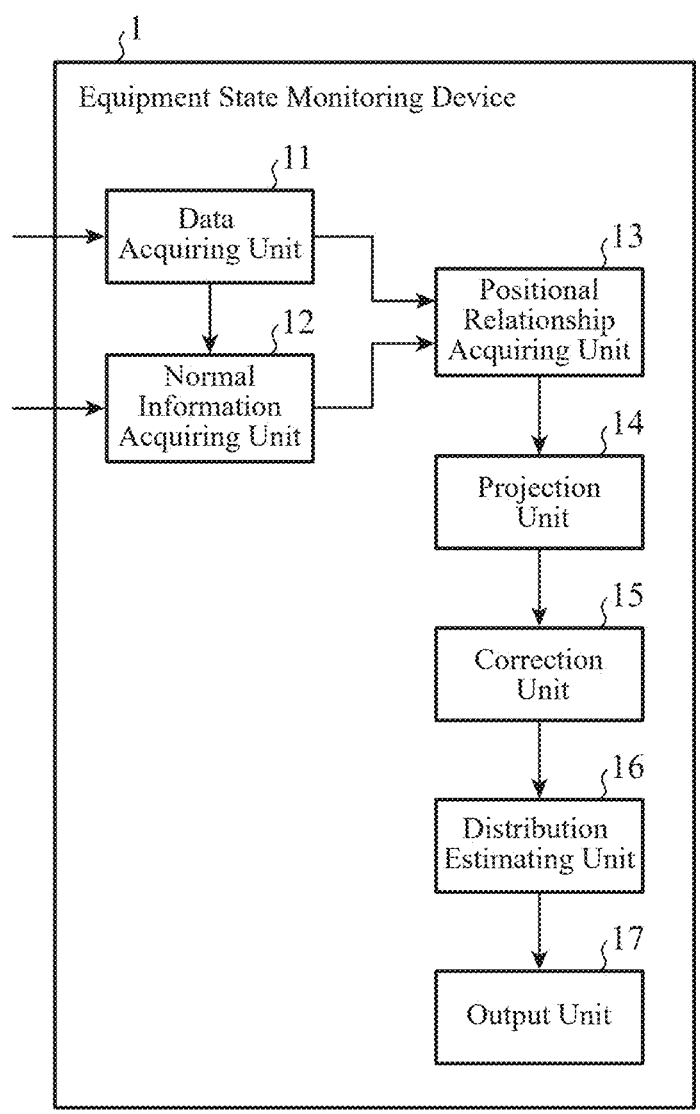
FIG. 1 is a block diagram illustrating a configuration of an equipment state monitoring device according to a first embodiment.

FIG. 1 is a block diagram showing a configuration of an equipment state monitoring device 1 according to a first embodiment. In FIG. 1, the equipment state monitoring device 1 is a device that monitors a state of equipment on the basis of a result of comparing actual measurement data indicating a state value of the equipment to be monitored with a display shape indicating normal information of the equipment in a dimensionless space. The normal information indicating a normal state of the equipment is, for example, a range of a state value indicating a normal operation state of the equipment, and is obtained for each operation state of the equipment.

As illustrated in FIG. 1, the equipment state monitoring device 1 includes a data acquiring unit 11, a normal information acquiring unit 12, a positional relationship acquiring unit 13, a projection unit 14, a correction unit 15, a distribution estimating unit 16, and an output unit 17. The equipment whose operation state is monitored by the equipment state monitoring device 1 is provided with sensors for detecting various operation state values of the equipment. The equipment to be monitored is, for example, an air conditioner.

The data acquiring unit 11 acquires actual measurement data indicating a state value of the equipment to be monitored. For example, the data acquiring unit 11 acquires actual measurement data for a certain period for monitoring the state of the equipment. The certain period for monitoring the state of the equipment is, for example, about one month. The actual measurement data is, for example, sensor data detected by the sensors provided in the equipment. In a case where the equipment is an air conditioner, the sensors are, for example, pressure sensors and temperature sensors installed at various parts of the air conditioner. On the basis of the sensor data detected by these sensors, normal information of the air conditioner is determined for each operation state of the air conditioner.

The normal information acquiring unit 12 acquires normal information of the equipment to be monitored. When the equipment to be monitored is an air conditioner, the normal information is, for example, a refrigeration cycle of a p-h diagram in a normal state of the air conditioner. For example, the normal information acquiring unit 12 calculates the refrigeration cycle in the normal operation state of the air conditioner, using the sensor data in the normal operation state detected by the pressure sensor and the temperature sensor provided in the air conditioner. That is, "acquisition" of the normal information performed by the normal information acquiring unit 12 includes not only reading and acquiring the normal information accumulated in a storage device but also calculating and acquiring the normal information using actual measurement data indicating a state value of the equipment.

A display shape indicating the normal information of the air conditioner is, for example, a refrigeration cycle diagram in a normal operation state of the air conditioner. Note that, the refrigeration cycle diagram of the air conditioner changes depending on the outside air temperature, and thus the refrigeration cycle diagram indicating the normal information of the air conditioner has a large number of shapes corresponding to various outside air temperatures. Further, the sensors provided in the air conditioner detect a large number of pieces of sensor data for each operation state of the air conditioner. For this reason, when a large number of pieces of sensor data are simply compared with normal information represented by a large number of display shapes, it is difficult to understand a correspondence relationship between the distribution of the sensor data and the normal information, and therefore it is difficult to accurately recognize the state of the equipment.

The positional relationship acquiring unit 13 acquires a positional relationship of actual measurement data in the display shape of the normal information of the equipment. For example, in a case where the display shape indicating the normal information of the equipment is a polygon, the positional relationship acquiring unit 13 calculates, as the positional relationship of the actual measurement data in the polygon, a distance between a center point of the polygon and the actual measurement data, and an angle formed by a straight line passing through the center point of the polygon and the actual measurement data and a side of the polygon which the straight line intersects. The center point of the polygon is, for example, the center of gravity.

Note that, the "acquisition" of the positional relationship performed by the positional relationship acquiring unit 13 also includes reading and acquiring positional relationship data stored in the storage device in addition to calculating the positional relationship using the actual measurement data and the normal information.

The projection unit 14 projects a plurality of pieces of actual measurement data to a dimensionless space on the basis of positional relationships between a plurality of display shapes indicating a respective plurality of pieces of normal information of the equipment and the plurality of pieces of actual measurement data. The dimensionless space is a space in which a plurality of display shapes indicating a respective plurality of pieces of normal information are represented by a common shape, and in which a plot (dimensionless) indicating a position of actual measurement data in the display shape indicating the normal information is disposed (projected).

The common shape is, for example, a circle having a radius of 1. The projection unit 14 treats, as the center point of the circle, the center points of the display shapes of the plurality of pieces of normal information corresponding to the plurality of pieces of actual measurement data, and thereby converts the positional relationship between the center point of the display shape of the normal information and the actual measurement data into the positional relationship with the center point of the circle. The converted positional relationship includes, for example, distance information and angle information. The projection unit 14 arranges plots of the plurality of pieces of actual measurement data in the dimensionless space including the circle. The plot of the actual measurement data arranged in the dimensionless space is a point of a dimensionless value indicating the positional relationship of the actual measurement data with respect to the display shape indicating the normal information of the equipment. In addition, the distribution of the plots in the dimensionless space corresponds to the distribution of the plots corresponding to the state values of the equipment.

The correction unit 15 corrects both or one of the normal information in the dimensionless space and the actual measurement data in the dimensionless space on the basis of the relationship between actual measurement data indicating the normal state of the equipment in the dimensionless space and the display shape indicating the normal information in the dimensionless space. For example, in a case where the display shape indicating the normal information of the equipment is a circle having a radius of 1 in the dimensionless space, the circle serves as a threshold for determining whether the operation state of the equipment is a normal state or an abnormal state. In addition, actual measurement data detected from the equipment in the normal operation state is most distributed at the center of the circle having a radius of 1 indicating the range of the normal state value of the equipment. The center of the circle corresponds to the origin of the coordinate system set in the dimensionless space (Hereinafter, it is referred to as the origin of the dimensionless space). In other words, the deviation between the center position of the distribution of the actual measurement data projected to the dimensionless space and the center position of the circle having a radius of 1 corresponds to an error between the normal information in the actual operation environment and the normal information assuming the ideal operation environment.

Therefore, the correction unit 15 calculates the shortest distance between the center position of the distribution of the actual measurement data projected to the dimensionless space and the circle having a radius of 1, and corrects the normal information and actual measurement data so that the display shape indicating the normal information becomes a circle having the calculated shortest distance as the radius. As a result, the relationship between the normal information of the equipment and the actual measurement data is corrected, and the state of the equipment can be accurately recognized by comparing them.

The distribution estimating unit 16 estimates the distribution of the states of the equipment on the basis of a plurality of pieces of actual measurement data projected to the dimensionless space. For example, by performing the Gaussian Mixture Model Estimation processing on the plots of the plurality of pieces of actual measurement data arranged in the dimensionless space, the distribution estimating unit 16 estimates the distribution of the plots in the dimensionless space, that is, the distribution of the state values of the equipment. The method of estimating the distribution of the state values of the equipment only needs to be able to estimate the probability density distribution of the plots in the dimensionless space, and for example, a maximum likelihood method, Bayesian estimation, or EM algorithm can be used.

The output unit 17 outputs data to be used for monitoring the state of the equipment. The data to be used for monitoring the state of the equipment is, for example, a dimensionless space in which a plurality of display shapes indicating a respective plurality of pieces of normal information are represented by a common shape, and in which the distribution of the state values of the equipment is disposed with respect to a region indicated by the common shape. The output unit 17 causes a display device to display the dimensionless space, for example. Note that the output unit 17 may be a component included in an external device provided separately from the equipment state monitoring device 1. In this case, the equipment state monitoring device 1 does not include the output unit 17, and the distribution of the state values of the equipment is displayed on a display device included in the external device by the output unit 17 included in the external device.

In addition, the equipment state monitoring device 1 may include only the correction unit 15 and the output unit 17, and the data acquiring unit 11, the normal information acquiring unit 12, the positional relationship acquiring unit 13, the projection unit 14, and the distribution estimating unit 16 may be components included in an external device provided separately from the equipment state monitoring device 1.

In this case, in the equipment state monitoring device 1, the correction unit 15 corrects both or any one of the normal information in the dimensionless space and the actual measurement data in the dimensionless space on the basis of the relationship between actual measurement data indicating the normal state of the equipment in the dimensionless space and the display shape indicating the normal information in the dimensionless space, the relationship being acquired from the projection unit 14 included in the external device. Then, the output unit 17 causes a display device included in the equipment state monitoring device 1 or a display device included in the external device to display the dimensionless space in which the distribution of the states of the equipment is projected to a common shape indicating each of a plurality of pieces of normal information of the equipment.

Figure 2:
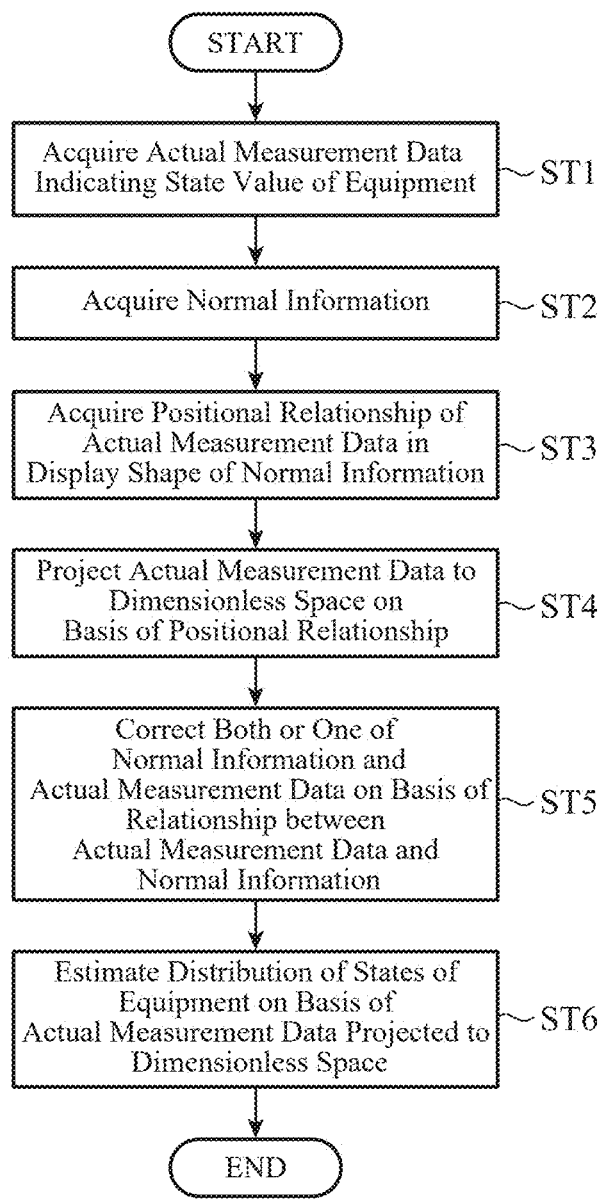
FIG. 2 is a flowchart illustrating an equipment state monitoring method according to the first embodiment.

FIG. 2 is a flowchart illustrating an equipment state monitoring method according to the first embodiment, and illustrates the operation of the equipment state monitoring device 1. The actual measurement data indicating the state value of the equipment is the following sensor data. The data acquiring unit 11 acquires sensor data indicating a state value of the equipment to be monitored (step ST1). For example, by continuously or periodically receiving sensor data sequentially detected by the sensor provided in the equipment, the data acquiring unit 11 acquires a time series of sensor data during a certain period (Hereinafter, it is described as a monitoring period.) for monitoring the equipment, that is, time series data on a state value of the equipment. Note that the sensor data may be stored in a storage device, and the data acquiring unit 11 may acquire the sensor data from the storage device.

Next, the normal information acquiring unit 12 acquires normal information indicating a normal state of the equipment to be monitored (step ST2). For example, when the equipment to be monitored is an air conditioner and the display shape indicating the normal information is the refrigeration cycle diagram data in the p-h diagram in the normal operation state of the air conditioner, the normal information acquiring unit 12 calculates the refrigeration cycle diagram data in the normal operation state of the air conditioner using the sensor data detected from the air conditioner in the normal operation state by the pressure sensor and the temperature sensor provided in the air conditioner. Alternatively, the refrigeration cycle diagram data in the normal operation state of the air conditioner may be stored in a storage device, and the normal information acquiring unit 12 may sequentially acquire the refrigeration cycle diagram data corresponding to the operation state in the monitoring period from the storage device.

Figure 3A:
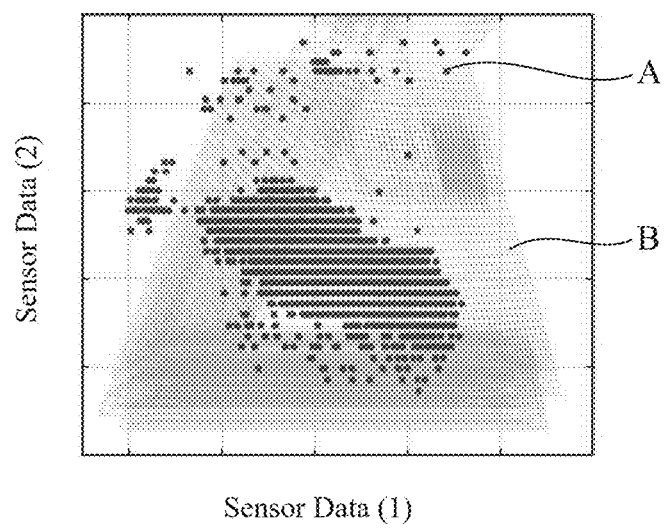
FIG. 3A is a graph illustrating a relationship between a plurality of display shapes indicating a respective plurality of pieces of normal information of equipment and a plurality of pieces of sensor data of the equipment.

The positional relationship acquiring unit 13 acquires a positional relationship of the sensor data in the display shape indicating the normal information of the equipment to be monitored (step ST3). FIG. 3A is a graph illustrating a relationship between a plurality of display shapes indicating a respective plurality of pieces of normal information of the equipment and a plurality of pieces of sensor data of the equipment, and illustrates a relationship between sensor data (1) and sensor data (2) detected by the sensors provided in the equipment. For example, the positional relationship acquiring unit 13 creates the graph illustrated in FIG. 3A using the actual measurement data acquired by the data acquiring unit 11 and the normal information acquired by the normal information acquiring unit 12.

In the graph illustrated in FIG. 3A, plots of a plurality of pieces of sensor data A each including the sensor data (1) and the sensor data (2) are arranged, and refrigeration cycle diagrams B indicating a plurality of pieces of normal information corresponding to these respective plots are displayed. As illustrated in FIG. 3A, even when the operation states specified from the sensor data (1) and the sensor data (2) are the same, the shape of the refrigeration cycle diagram B varies depending on the external environment or the operation state of the air conditioner. When the refrigeration cycle diagram B of the normal information varies, the correspondence relationship between the plot of the sensor data A and the refrigeration cycle diagram B of the normal information becomes complicated as illustrated in FIG. 3A, and therefore the state of the equipment cannot be accurately recognized.

Therefore, the equipment state monitoring device 1 projects a plurality of pieces of actual measurement data detected from the equipment to a dimensionless space in which the plurality of display shapes indicating the respective plurality of pieces of normal information are represented by a common shape. As a result, the equipment state monitoring device 1 can recognize a plurality of states in the equipment on the basis of the common display shape. The positional relationship acquiring unit 13 acquires, as information for projecting the actual measurement data to the dimensionless space, a positional relationship of the actual measurement data in the display shape indicating the normal information. This positional relationship includes, for example, information indicating a distance between the center point of the display shape indicating the normal information and the actual measurement data, and information indicating an angle formed by a straight line passing through the center point of the display shape indicating the normal information and the actual measurement data and a side of the display shape indicating the normal information which the straight line intersects.

Figure 3B:
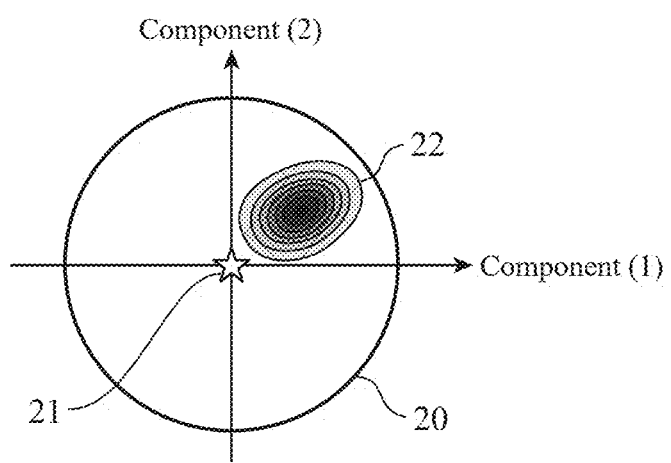
FIG. 3B is a graph illustrating a dimensionless space to which a plurality of pieces of sensor data of the equipment are projected.

The projection unit 14 projects a plurality of pieces of sensor data detected from the equipment to the dimensionless space on the basis of positional relationships between the plurality of display shapes indicating the respective plurality of pieces of normal information of the equipment and the plurality of pieces of sensor data (step ST4). FIG. 3B is a graph illustrating a dimensionless space to which a plurality of pieces of sensor data of the equipment are projected. For example, in FIG. 3B, the projection unit 14 treats, as a center 21 of a circle 20 in the dimensionless space, the center point of each of the display shapes indicating the plurality of pieces of normal information corresponding to the plurality of pieces of sensor data, and thereby converts the positional relationships between the center points of the display shapes indicating the pieces of normal information and the pieces of sensor data into positional relationships with the center 21 of the circle 20, thereby arranging the plots of the plurality of pieces of sensor data in the circle 20. As a result, a distribution 22 of the sensor data is disposed in the circle 20.

The position of the plot of the sensor data in the dimensionless space is a position corresponding to the relationship between the sensor data before projection and the display shape indicating the normal information. Note that a component (1) illustrated in FIG. 3B is a component corresponding to change of the sensor data (1), and a component (2) is a component corresponding to change of the sensor data (2).

Figure 4:
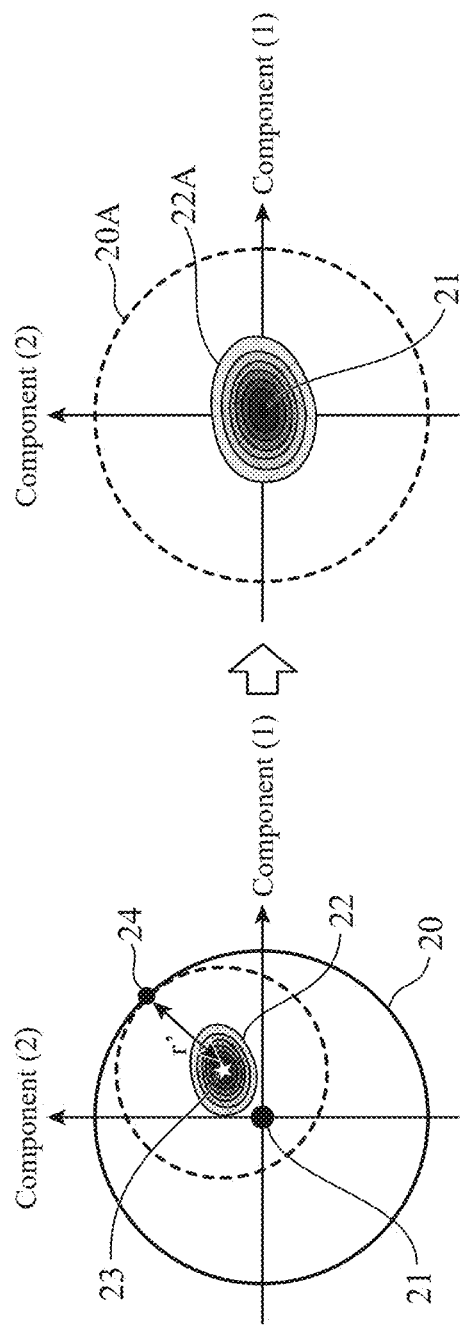
FIG. 4 is an explanatory diagram illustrating an outline of correction processing of normal information of the equipment.

The correction unit 15 corrects the normal information and the sensor data on the basis of a relationship between sensor data and the normal information (step ST5). FIG. 4 is an explanatory diagram illustrating an outline of correction processing of the normal information of the equipment. In FIG. 4, the display shape indicating the normal information of the equipment is a circle 20 having a radius of 1 set in the dimensionless space. The center 21 of the circle 20 is the origin of the coordinate system of the dimensionless space. Sensor data detected from the equipment in a normal operation state is most distributed at the center 21 of the circle 20.

However, as in the graph on the left side in FIG. 4, in the dimensionless space before the normal information of the equipment is corrected, a center 23 of a distribution 22 of the sensor data deviates from the center 21 of the circle 20. A deviation amount between the center 21 of the circle 20 and the center 23 of the distribution 22 of the sensor data in the coordinate system of the dimensionless space corresponds to an error between the normal information in the actual operation environment and the normal information assuming the ideal operation environment.

The correction unit 15 corrects the normal information so that there is no deviation between the center 21 of the circle 20 and the center 23 of the distribution 22 of the sensor data. That is, the normal information of the equipment is corrected to be represented by a circle 20A centered on the center 23 of the distribution 22 of the sensor data. For example, the correction unit 15 searches for a nearest point 24 between the center 23 of the distribution 22 of the sensor data and the circle 20. The position of the center 23 of the distribution 22 of the sensor data is, for example, a position corresponding to an average value or a median value of coordinate values in the X-axis direction and the Y-axis direction of plots of the sensor data arranged in the dimensionless space.

The correction unit 15 calculates a distance r' between the found nearest point 24 and the center 23 of the distribution 22 of the sensor data, and corrects the normal information to be represented by the circle 20A having a radius of r' as in the graph on the right side in FIG. 4. Thereafter, the correction unit 15 may correct the variation in a distribution 22 of sensor data to 1/r' times. For example, the correction unit 15 disposes, in the circle 20A, a new distribution 22A in which the distance between the center 23 of the distribution 22 and each plot is multiplied by 1/r'. As a result, the actual measurement data is corrected in addition to the normal information of the equipment.

The distribution estimating unit 16 estimates the distribution of the states of the equipment on the basis of the plurality of pieces of sensor data projected to the dimensionless space (step ST6). For example, the distribution estimating unit 16 estimates the distribution 22A in the dimensionless space illustrated in FIG. 4 by performing the Gaussian Mixture Model Estimation processing on a plurality of plots arranged in the dimensionless space. In the distribution 22A, the color or shade is determined depending on the number of plots corresponding to the sensor data, and the number of plots corresponding to the sensor data is the largest in a region where the color is the darkest and decreases as the color becomes lighter. The output unit 17 displays the dimensionless space in which the distribution 22A is disposed on the display device.

Figure 5:
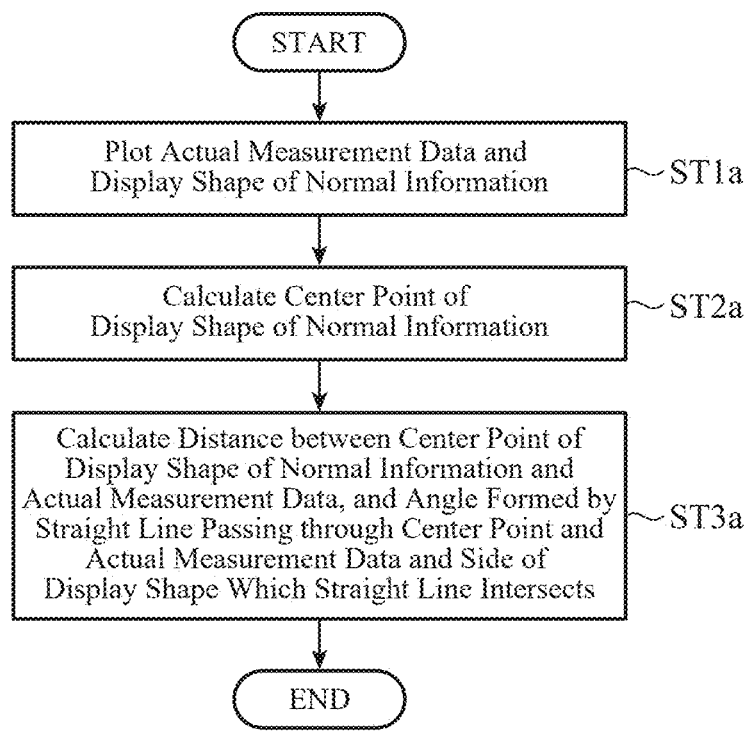
FIG. 5 is a flowchart illustrating positional relationship calculation processing.

FIG. 5 is a flowchart illustrating positional relationship calculation processing, and illustrates details of processing in step ST3 of FIG. 2. The positional relationship acquiring unit 13 displays a two-dimensional coordinate plane in which the plots of the sensor data of the equipment acquired by the data acquiring unit 11 are arranged and the shapes indicating the normal information of the equipment acquired by the normal information acquiring unit 12 are arranged (step ST1a).

Figure 6:
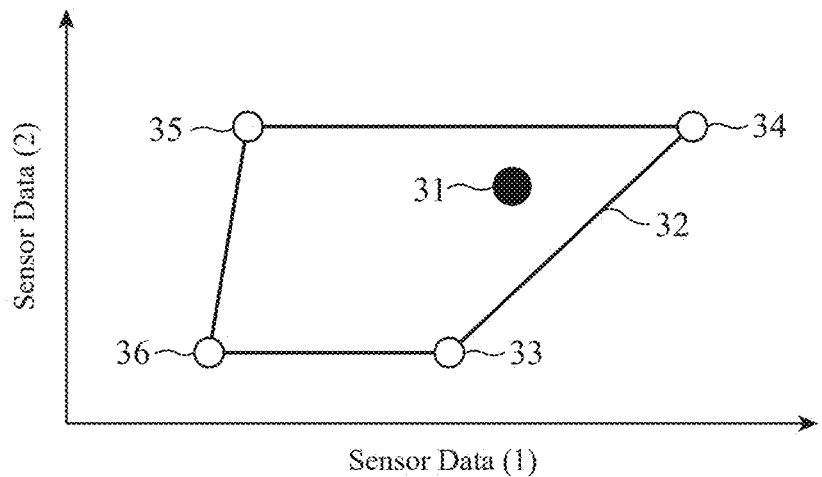
FIG. 6 is a graph illustrating a relationship between a display shape indicating normal information of the equipment and sensor data detected from the equipment.

FIG. 6 is a graph illustrating a relationship between a display shape indicating normal information of the equipment and sensor data detected from the equipment. In FIG. 6, sensor data 31 is data indicating a state value of the equipment specified from sensor data (1) and sensor data (2) detected from the equipment to be monitored. A display shape 32 is normal information for the operation state of the equipment indicated by the sensor data 31, and is a quadrangular shape having the vertices 33 to 36.

Figure 7:
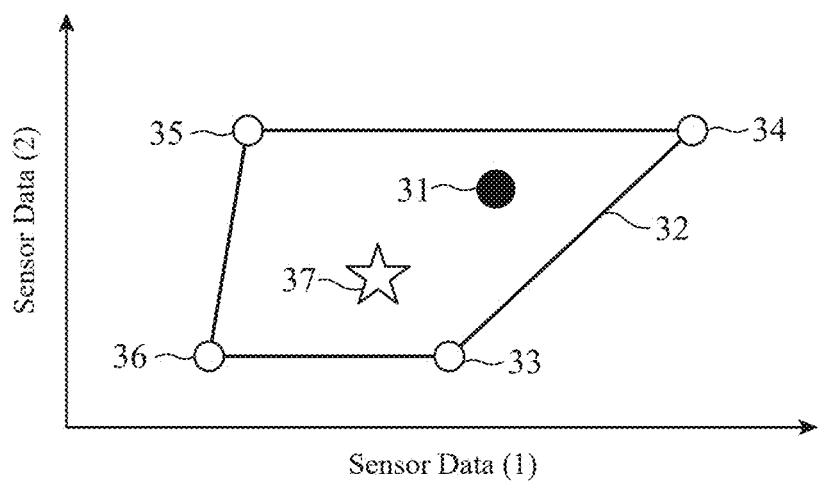
FIG. 7 is a graph illustrating the display shape indicating the normal information of the equipment, the sensor data detected from the equipment, and a center point of the display shape indicating the normal information of the equipment.

The positional relationship acquiring unit 13 calculates a center 37 of the display shape 32 (step ST2a). FIG. 7 is a graph illustrating the display shape 32 indicating the normal information of the equipment, the sensor data 31 detected from the equipment, and the center 37. For example, the positional relationship acquiring unit 13 calculates the center of gravity of the outer shape of the display shape 32 as the center 37. In FIG. 7, since the display shape 32 is a quadrangle, the positional relationship acquiring unit 13 calculates an intersection of a diagonal line connecting the vertex 33 and the vertex 35 and a diagonal line connecting the vertex 34 and the vertex 36 as the center 37.

Figure 8:
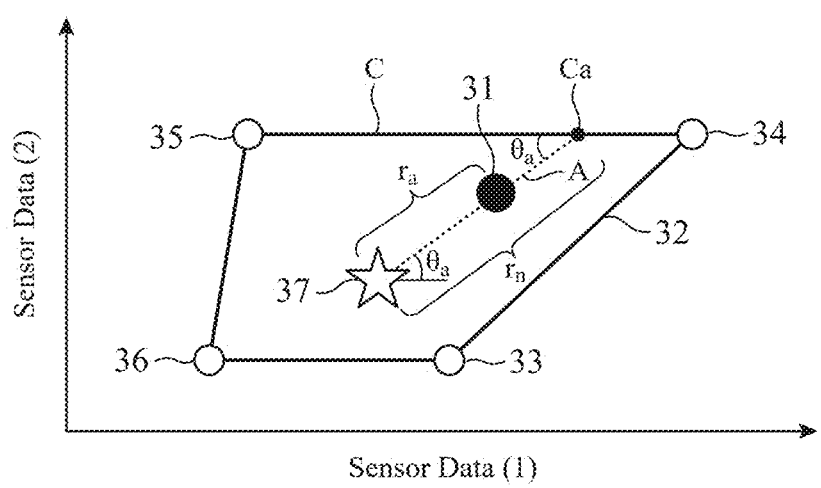
FIG. 8 is a graph illustrating a positional relationship between the display shape indicating the normal information of the equipment and the sensor data detected from the equipment.

FIG. 8 is a graph illustrating a positional relationship between the display shape 32 indicating the normal information of the equipment and the sensor data 31 detected from the equipment. As illustrated in FIG. 8, in addition to a distance $r_a$ between the sensor data 31 and the center 37 of the display shape 32, the positional relationship acquiring unit 13 calculates an angle $\theta_a$ formed by a straight line A passing through the sensor data 31 and the center 37 of the display shape 32 and a side C of the display shape 32 which the straight line A intersects (step ST3a). Next, the positional relationship acquiring unit 13 calculates a distance $r_n$ from the center 37 of the display shape 32 to an intersection point Ca between the straight line A and the side C of the display shape 32.

The positional relationship acquiring unit 13 calculates a relative ratio $r_R$ ($=r_a/r_n$) of the distance $r_a$ to the distance $r_n$ that is the length of the straight line A. Subsequently, the positional relationship acquiring unit 13 calculates the angle $\theta_a$ formed by the straight line A and the side C. The relative ratio $r_R$ and the angle $\theta_a$ calculated in this manner are output to the projection unit 14 as data indicating the positional relationship of the sensor data 31 with respect to the center 37 of the display shape 32.

Figure 9:
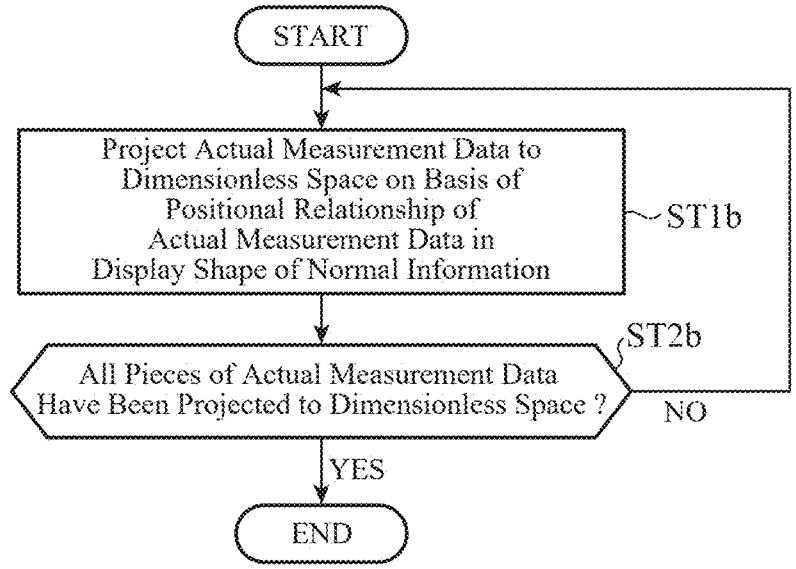
FIG. 9 is a flowchart illustrating projection processing of sensor data to a dimensionless space.
Figure 10:
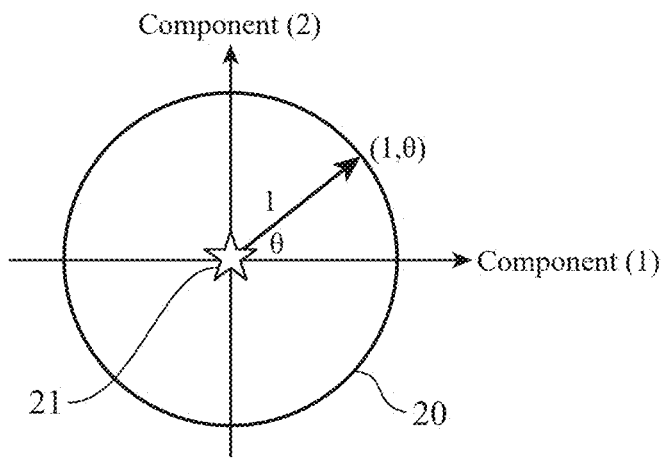
FIG. 10 is a graph illustrating an example of the dimensionless space.

FIG. 9 is a flowchart illustrating projection processing of sensor data to a dimensionless space, and illustrates details of processing in step ST4 of FIG. 2. FIG. 10 is a graph illustrating an example of the dimensionless space. The dimensionless space may be a space in which a circle 20 having a radius of 1 as illustrated in FIG. 10 is set. Assuming that the angle from the axis of the component (1) is θ, a point on the circle 20 is represented by (1, θ). The component (1) is a component corresponding to change of the sensor data (1) of FIG. 6, and the component (2) is a component corresponding to change of the sensor data (2) of FIG. 6.

Figure 11:
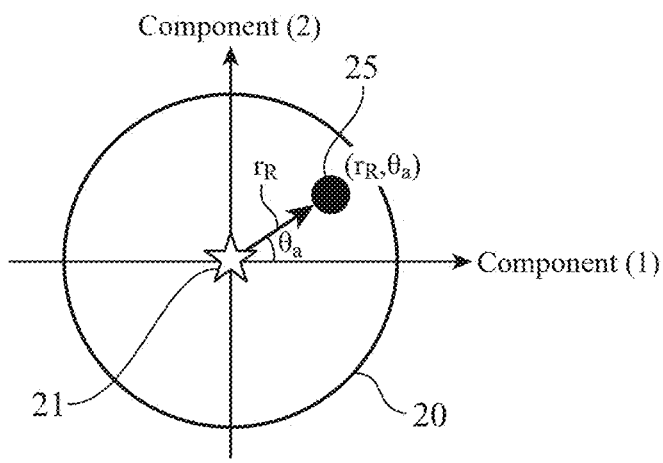
FIG. 11 is a graph showing sensor data projected to the dimensionless space of FIG. 10.

The projection unit 14 projects the sensor data (actual measurement data) 31 to the dimensionless space on the basis of the positional relationship of the sensor data 31 in the display shape 32 (step ST1b). FIG. 11 is a graph showing sensor data 25 projected to the dimensionless space of FIG. 10. For example, the projection unit 14 treats the center 37 of the display shape 32 illustrated in FIG. 8 as the center 21 of the circle 20 in the dimensionless space illustrated in FIG. 10. Subsequently, by replacing it with a circle 20 having a radius of $r_n$ and using the relative ratio $r_R$ of the distance from the center 37 of the display shape 32 to the sensor data 31 and the angle $θ_a$ formed by the straight line A passing through the sensor data 31 and the side C of the display shape 32, the projection unit 14 disposes a plot of the sensor data 25 in the dimensionless space. As illustrated in FIG. 11, the plot of the sensor data 25 is converted into a point ($r_R$, $θ_a$) and disposed in the dimensionless space.

The projection unit 14 checks whether or not all pieces of the sensor data 31 of which the positional relationships with the respective display shapes 32 have been acquired have been projected to the dimensionless space (step ST2b). Here, if there is sensor data 31 that has not been projected to the dimensionless space (step ST2b; NO), the processing returns to step ST1b, and the centers 37 of the plurality of display shapes 32 are sequentially treated as the center 21 of the circle 20, and thereby the sensor data 31 is projected to the dimensionless space. When there is no sensor data 31 that has not been projected to the dimensionless space (step ST2b; YES), the processing of FIG. 9 ends.

Figure 12:
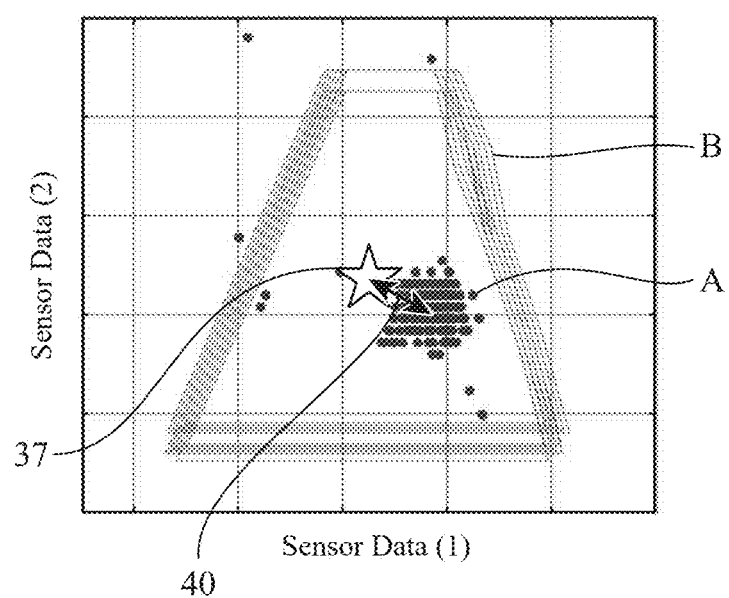
FIG. 12 is a graph illustrating an outline of correction processing of sensor data of the equipment.

The correction unit 15 corrects both or one of the normal information in the dimensionless space and the sensor data in the dimensionless space on the basis of the relationship between sensor data indicating the normal state of the equipment in the dimensionless space and the display shape indicating the normal information in the dimensionless space. FIG. 12 is a graph illustrating an outline of the correction processing of the sensor data of the equipment. In a case of assuming that the equipment is not deteriorated, the distribution of sensor data A obtained from the equipment in the normal operation state is distributed near the center 37 of the normal information. However, if the individual difference of the equipment or information necessary for calculating the normal information is not obtained sufficiently, an error occurs in the normal information of the equipment. As a result, as illustrated in FIG. 12, a deviation 40 occurs between the sensor data A and the center 37 of the display shape B.

As illustrated in FIG. 12, when similar display shapes B are extracted from a plurality of display shapes B (For example, a refrigeration cycle diagram) indicating a respective plurality of pieces of normal information, operation states of the equipment corresponding to the similar display shapes B are similar. A plurality of pieces of sensor data A indicating the similar operation states tend to be distributed at close positions in the display shape B indicating the normal information of the equipment. The correction unit 15 uses this tendency to estimate the deviation 40 between the sensor data A and the center 37 of the display shape B, thereby correcting the sensor data A and the display shape B.

Figure 13:
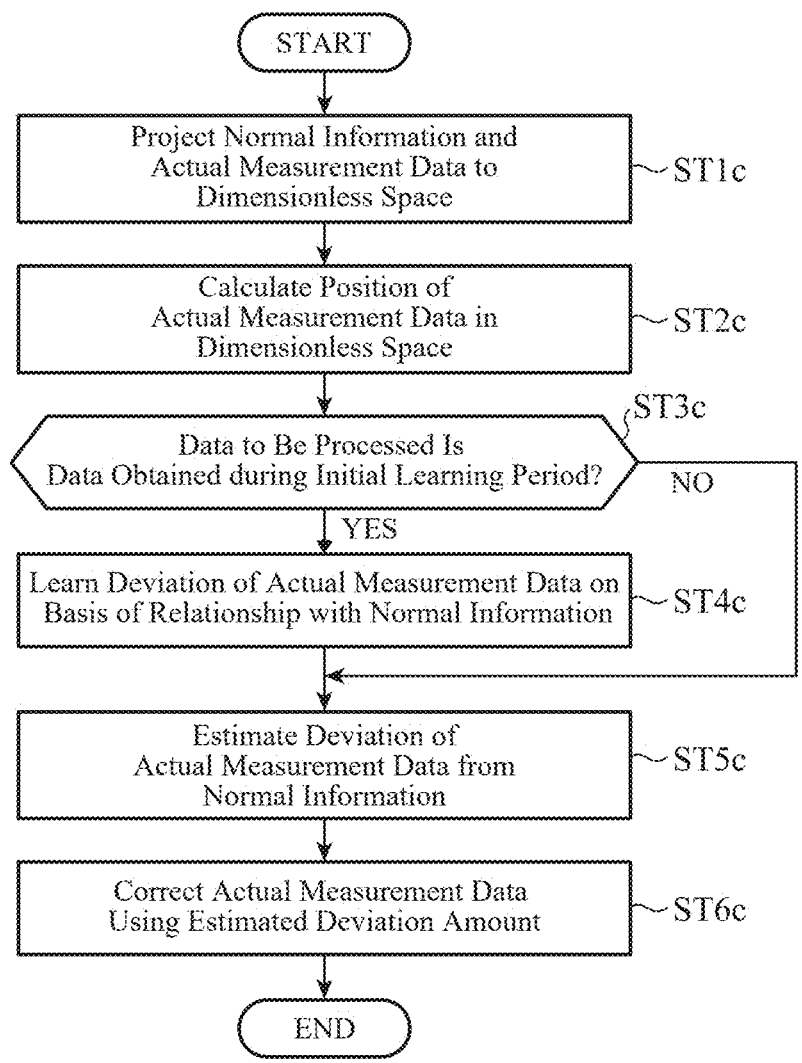
FIG. 13 is a flowchart illustrating projection processing and correction processing of sensor data of the equipment.
Figure 14:
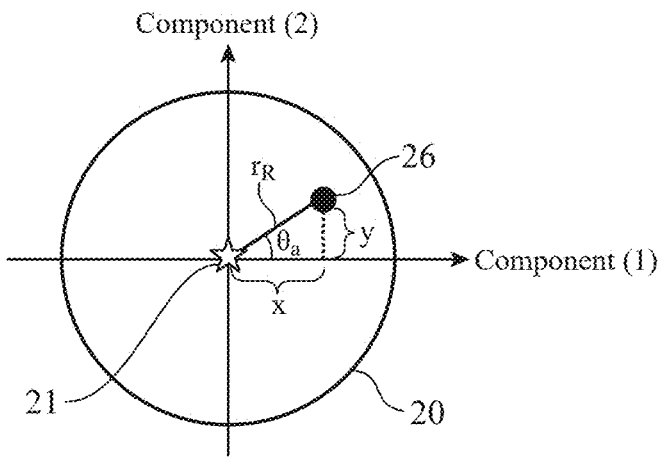
FIG. 14 is a graph illustrating a positional relationship of sensor data of the equipment in the dimensionless space.

FIG. 13 is a flowchart illustrating projection processing and correction processing of the sensor data of the equipment, and illustrates details of processing of steps ST4 and ST5 in FIG. 2. FIG. 14 is a graph illustrating a positional relationship of the sensor data (Hereinafter, it is described as actual measurement data.) of the equipment in the dimensionless space. For example, in the dimensionless space illustrated in FIG. 14, the projection unit 14 disposes a circle 20 having a radius of 1 indicating the normal information of the equipment, and disposes a plot of the actual measurement data (step ST1c).

The correction unit 15 calculates a position (x, y) of the plot of the actual measurement data of the equipment in the dimensionless space whose origin is the center 21 of the circle 20 (step ST2c). Note that the position (x, y) of the plot of the actual measurement data of the equipment is a position indicating a deviation from the origin of the dimensionless space. The position in the dimensionless space may be represented in a polar coordinate format.

Next, the correction unit 15 determines whether or not the actual measurement data for which the position (x, y) has been calculated is data obtained during an initial learning period (step ST3c). The initial learning period is a period for learning a relationship between position coordinates of the display shape indicating the normal information in the dimensionless space and position coordinates of a plot of a plurality of pieces of actual measurement data in the dimensionless space obtained from the equipment in a normal state. The initial learning period is set in advance by the user, for example.

In a case where the actual measurement data is data obtained during the initial learning period (step ST3c; YES), the correction unit 15 learns the deviation of the actual measurement data from the origin on the basis of the relationship between the normal information and the actual measurement data (step ST4c). For example, the correction unit 15 acquires a learner that has learned the correlation between the position (x, y) of the plot of the actual measurement data detected from the equipment in the normal state within the initial learning period and the position coordinates of the display shape indicating the normal information of the equipment in the dimensionless space. In this case, the learning data includes the position of the plot of the actual measurement data detected from the equipment in the normal state and the position of the display shape indicating the normal information of the equipment in the dimensionless space.

The learner uses, as an input, position coordinates of a display shape indicating normal information of the equipment in the dimensionless space, and estimates a position (x', y') of estimation data in the dimensionless space, the estimation data indicating a normal state value in various operation states of the equipment. The position (x', y') of the estimation data is a position indicating a deviation from the origin of the dimensionless space. In addition, the position coordinates of the display shape indicating the normal information of the equipment in the dimensionless space are, for example, the position coordinates of the vertices 33 to 36 of the quadrangular shape indicating the normal information of the equipment illustrated in FIG. 6. The learner may perform estimation using multiple regression analysis or a neural network for estimation.

In a case where the learner is acquired during the initial learning period, or in a case where the actual measurement data is not data obtained during the initial learning period and the learner is acquired because the initial learning period has elapsed (step ST3c; NO), the correction unit 15 estimates the position (x', y') of the estimation data by using the learner (step ST5c). For example, the correction unit 15 inputs the position coordinates of the vertices 33 to 36 of the quadrangular shape indicating the normal information of the equipment illustrated in FIG. 6 to the learner, thereby estimating the position (x', y') of the estimation data in the dimensionless space.

The correction unit 15 corrects the position (x, y) of the plot of the actual measurement data detected after the initial learning period, by using the position (x', y') of the estimation data corresponding to the state indicated by the actual measurement data (step ST6c). For example, the correction unit 15 subtracts the position (x', y') of the estimation data from the position (x, y) of the plot of the actual measurement data of the equipment disposed in the dimensionless space, and thereby corrects the actual measurement data in such a manner as to reduce the deviation from the origin of the dimensionless space. As a result, the position (x-x', y-y') of the actual measurement data after correction is obtained. In this manner, the actual measurement data detected from the equipment after the initial learning period is corrected.

Note that the learning data for the learner may be actual measurement data detected from the equipment in a normal state. That is, by using the actual measurement data detected from the equipment in the normal state as the learning data, the learner learns the correlation between the actual measurement data detected from the equipment in the normal state and the position of the display shape indicating the normal information of the equipment in the dimensionless space. Also in this manner, the learner can be obtained that uses, as an input, position coordinates of a display shape indicating normal information of the equipment in the dimensionless space, and that estimates the position (x', y') of the estimation data in the dimensionless space, the estimation data indicating the normal state value in various operation states of the equipment.

Figure 15A:
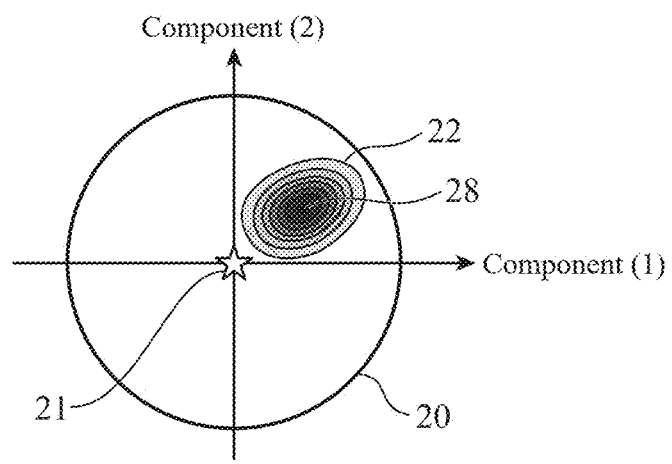
FIG. 15A is a graph illustrating a distribution of sensor data projected to the dimensionless space.

The distribution estimating unit 16 estimates the distribution 22 of the actual measurement data in the dimensionless space illustrated in FIG. 3B, for example, by performing the Gaussian Mixture Model Estimation processing on the plots of the plurality of pieces of actual measurement data whose positions in the dimensionless space have been corrected by the correction unit 15. FIG. 15A is a graph illustrating a distribution 22 of the sensor data projected to the dimensionless space. In the distribution 22 of the sensor data, the number of plots of the sensor data is the largest in a region 28 having the darkest color, and decreases as the color becomes lighter.

In FIG. 15A, the component (1) is a component corresponding to change of the sensor data (1), and the component (2) is a component corresponding to change of the sensor data (2). In the distribution 22, the region 28 has the most plots of the sensor data, and the sensor data in the region 28 has a dominant influence on the characteristic of the distribution 22. The circle 20 is a display shape indicating a normal state of the equipment indicated by sensor data including the sensor data (1) and the sensor data (2).

The distribution estimating unit 16 determines whether or not the state of the equipment to be monitored is close to the normal state on the basis of the positional relationship between the region 28 of the distribution 22 and the circle 20. Since the region 28 of the distribution 22 is present at a position away from the center 21 of the circle 20, it can be seen that the state of the equipment is out of the normal state, that is, the state of the equipment is deteriorated. As described above, the equipment state monitoring device 1 can specify the change tendency of the state of the equipment in the monitoring period, and even if an outlier incidentally occurs in the sensor data, its influence is reduced.

Figure 15B:
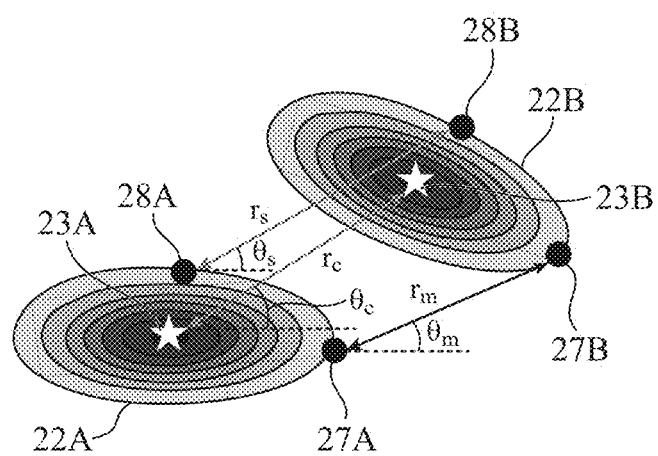
FIG. 15B is an explanatory diagram illustrating an outline of estimation processing of a state of the equipment based on the distribution of the sensor data projected to the dimensionless space.

FIG. 15B is an explanatory diagram illustrating an outline of estimation processing of the state of the equipment based on the distribution of the sensor data projected to the dimensionless space. In FIG. 15B, a distribution 22A is a distribution of the states of the equipment estimated by the distribution estimating unit 16, and is estimated on the basis of sensor data acquired in a monitoring period (1). A distribution 22B is a distribution in the same state as the distribution 22A, but is a distribution estimated on the basis of sensor data acquired in a monitoring period (2) which is after the monitoring period (1). Further, the outer shapes of the distribution 22A and the distribution 22B are elliptical.

The state of the equipment to be monitored changes over time, and thereby the distribution 22A transitions to the distribution 22B. At this time, the transition from the center point 23A of the distribution 22A to the center point 23B of the distribution 22B can be represented by $(r_c, \theta_c)$. The distance $r_c$ is a distance between the center point 23A and the center point 23B, and the angle $\theta_c$ is an angle formed by a line segment connecting the center point 23A and the center point 23B at the center point 23A. Similarly, the transition from the point 27A on the major axis of the distribution 22A to the point 27B on the major axis of the distribution 22B can be represented by $(r_m, \theta_m)$, and the transition from the point 28A on the minor axis of the distribution 22A to the point 28B on the minor axis of the distribution 22B can be represented by $(r_s, \theta_s)$.

The distribution estimating unit 16 specifies the positional relationship between the distribution of the sensor data projected to the dimensionless space and, for example, the circle 20 illustrated in FIG. 15A on the basis of the $(r, \theta)$ representing the transition of the distribution of the actual measurement data projected to the dimensionless space, and determines whether or not the state of the equipment to be monitored has deteriorated on the basis of the specified positional relationship. In this manner, by quantifying the temporal transition of the distribution estimated by the distribution estimating unit 16, it is possible to accurately determine the state degradation of the equipment to be monitored.

In the equipment state monitoring device 1, the display shape indicating the normal information of the equipment in the dimensionless space may be a circular shape or a polygonal shape.

The functions of the data acquiring unit 11, the normal information acquiring unit 12, the positional relationship acquiring unit 13, the projection unit 14, the correction unit 15, the distribution estimating unit 16, and the output unit 17 in the equipment state monitoring device 1 are implemented by a processing circuit. That is, the equipment state monitoring device 1 includes a processing circuit for executing the processing from step ST1 to step ST6 in FIG. 2. The processing circuit may be dedicated hardware or a central processing unit (CPU) that executes a program stored in a memory.

Figure 16A:
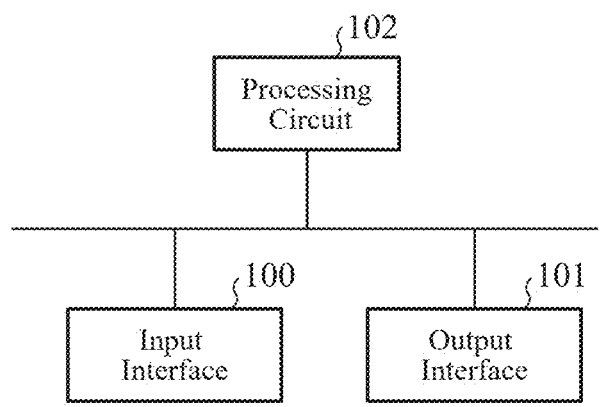
FIG. 16A is a block diagram illustrating a hardware configuration for implementing the functions of the equipment state monitoring device according to the first embodiment.
Figure 16B:
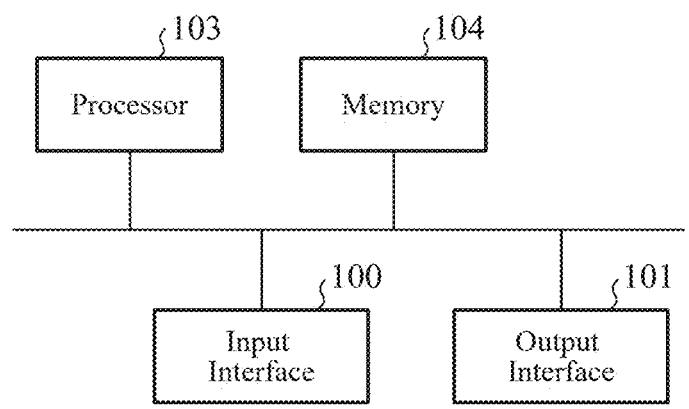
FIG. 16B is a block diagram illustrating a hardware configuration for executing software for implementing the functions of the equipment state monitoring device according to the first embodiment.

FIG. 16A is a block diagram illustrating a hardware configuration that implements the functions of the equipment state monitoring device 1. FIG. 16B is a block diagram illustrating a hardware configuration for executing software that implements the functions of the equipment state monitoring device 1. In FIGS. 16A and 16B, an input interface 100 is an interface that relays sensor data output from the sensor provided in the equipment to be monitored to the equipment state monitoring device 1. Further, an output interface 101 is an interface that relays information output from the equipment state monitoring device 1.

In a case where the processing circuit is a processing circuit 102 of dedicated hardware illustrated in FIG. 16A, the processing circuit 102 corresponds to, for example, a single circuit, a composite circuit, a programmed processor, a parallel programmed processor, an application specific integrated circuit (ASIC), a field-programmable gate array (FPGA), or a combination thereof. The functions of the data acquiring unit 11, the normal information acquiring unit 12, the positional relationship acquiring unit 13, the projection unit 14, the correction unit 15, the distribution estimating unit 16, and the output unit 17 in the equipment state monitoring device 1 may be implemented by separate processing circuits, or these functions may be collectively implemented by one processing circuit.

In a case where the processing circuit is a processor 103 illustrated in FIG. 16B, the functions of the data acquiring unit 11, the normal information acquiring unit 12, the positional relationship acquiring unit 13, the projection unit 14, the correction unit 15, the distribution estimating unit 16, and the output unit 17 in the equipment state monitoring device 1 are implemented by software, firmware, or a combination of software and firmware. Note that software or firmware is written as a program and stored in a memory 104.

The processor 103 reads and executes the program stored in the memory 104 to implement the functions of the data acquiring unit 11, the normal information acquiring unit 12, the positional relationship acquiring unit 13, the projection unit 14, the correction unit 15, the distribution estimating unit 16, and the output unit 17 in the equipment state monitoring device 1. For example, the equipment state monitoring device 1 includes the memory 104 for storing a program that, when executed by the processor 103, results in execution of the processing of steps ST1 to ST5 in the flowchart illustrated in FIG. 2. These programs cause a computer to execute procedures or methods performed by the data acquiring unit 11, the normal information acquiring unit 12, the positional relationship acquiring unit 13, the projection unit 14, the correction unit 15, the distribution estimating unit 16, and the output unit 17. The memory 104 may be a computer-readable storage medium storing a program for causing a computer to function as the data acquiring unit 11, the normal information acquiring unit 12, the positional relationship acquiring unit 13, the projection unit 14, the correction unit 15, the distribution estimating unit 16, and the output unit 17.

Examples of the memory 104 correspond to a nonvolatile or volatile semiconductor memory, such as a random access memory (RAM), a read only memory (ROM), a flash memory, an erasable programmable read only memory (EPROM), or an electrically-EPROM (EEPROM), a magnetic disk, a flexible disk, an optical disk, a compact disk, a mini disk, and a DVD.

A part of the functions of the data acquiring unit 11, the normal information acquiring unit 12, the positional relationship acquiring unit 13, the projection unit 14, the correction unit 15, the distribution estimating unit 16, and the output unit 17 in the equipment state monitoring device 1 may be implemented by dedicated hardware, and another part thereof may be implemented by software or firmware. For example, the functions of the data acquiring unit 11, the normal information acquiring unit 12, and the positional relationship acquiring unit 13 are implemented by the processing circuit 102, which is dedicated hardware, and the functions of the projection unit 14, the correction unit 15, the distribution estimating unit 16, and the output unit 17 are implemented by the processor 103 reading and executing the program stored in the memory 104. As described above, the processing circuit can implement the above functions by hardware, software, firmware, or a combination thereof.

As described above, the equipment state monitoring device 1 according to the first embodiment projects a plurality of pieces of actual measurement data indicating a state value of the equipment to a dimensionless space in which a plurality of display shapes indicating a respective plurality of pieces of normal information indicating a normal state of the equipment are represented by a common shape, and estimates the distribution of the state of the equipment on the basis of the plurality of pieces of actual measurement data projected to the dimensionless space. Further, both or one of the normal information in the dimensionless space and the actual measurement data in the dimensionless space is corrected on the basis of the relationship between actual measurement data indicating the normal state of the equipment in the dimensionless space and the display shape indicating the normal information in the dimensionless space. As a result, the equipment state monitoring device 1 can accurately recognize the state of the equipment.

In the equipment state monitoring device 1 according to the first embodiment, the positional relationship acquiring unit 13 calculates, as information indicating the positional relationship of the actual measurement data in the display shape indicating the normal information, a distance between a center point of the display shape indicating the normal information and the actual measurement data, and an angle formed by a straight line passing through the center point and the actual measurement data and a side of the display shape indicating the normal information, the straight line intersecting the side. As a result, it is possible to accurately acquire the information indicating the positional relationship of the actual measurement data in the display shape indicating the normal information.

In the equipment state monitoring device 1 according to the first embodiment, the correction unit 15 includes the learner that estimates, using a position of a display shape indicating the normal information in the dimensionless space as an input, a position of data indicating a normal state value of the equipment in the dimensionless space, and the correction unit 15 corrects the actual measurement data using the position of the data estimated by the learner in such a manner as to reduce a deviation from an origin of the dimensionless space. As a result, it is possible to accurately correct the deviation of the actual measurement data, which is projected to the dimensionless space, from the origin of the dimensionless space.

Note that any component of the embodiment can be modified or any component of the embodiment can be omitted.

INDUSTRIAL APPLICABILITY

The equipment state monitoring device according to the present disclosure can be used, for example, for monitoring an operation state of an air conditioner.

REFERENCE SIGNS LIST

1: equipment state monitoring device, 11: data acquiring unit, 12: normal information acquiring unit, 13: positional relationship acquiring unit, 14: projection unit, 15: correction unit, 16: distribution estimating unit, 17: output unit, 20, 20A: circle, 22, 22A, 22B: distribution, 23, 37: center, 23A, 23B: center point, 24: nearest point, 25, 31: sensor data, 28: region, 32: display shape, 33 to 36: vertex, 40: deviation, 100: input interface, 101: output interface, 102: processing circuit, 103: processor, 104: memory

The invention claimed is:

1. An equipment state monitoring device, comprising:
processing circuitry
to acquire pieces of actual measurement data each indicating a state value of equipment;
to acquire pieces of normal information each indicating a normal state of the equipment;
to acquire a positional relationship of each of the pieces of the actual measurement data in a corresponding one of display shapes indicating the respective pieces of the normal information of the equipment;
to project each of the pieces of the actual measurement data to a dimensionless space on a basis of the positional relationship between a corresponding one of the display shapes indicating the respective pieces of the normal information and a corresponding one of the pieces of the actual measurement data, the dimensionless space being a space in which the display shapes indicating the respective pieces of the normal information of the equipment are represented by a common shape;
to correct both or one of the normal information in the dimensionless space and the actual measurement data in the dimensionless space on a basis of a relationship between actual measurement data indicating the normal state of the equipment in the dimensionless space and a display shape indicating the normal information in the dimensionless space; and
to estimate a distribution of a state of the equipment on a basis of the pieces of the actual measurement data projected to the dimensionless space.

2. An equipment state monitoring device that monitors a state of equipment, the equipment state monitoring device comprising:
processing circuitry
to output data to be used to monitor the state of the equipment; and
to correct actual measurement data indicating a state value of the equipment or normal information indicating a normal state of the equipment; wherein
the processing circuitry outputs a dimensionless space in which display shapes indicating respective pieces of the normal information of the equipment are represented by a common shape, and a distribution of the state of the equipment is projected to the common shape, and
the processing circuitry corrects both or one of the normal information in the dimensionless space and the actual measurement data in the dimensionless space on a basis of a relationship between actual measurement data indicating the normal state of the equipment in the dimensionless space and a display shape indicating the normal information in the dimensionless space.

3. The equipment state monitoring device according to claim 2, wherein
the processing circuitry acquires pieces of the actual measurement data;
the processing circuitry acquires the pieces of the normal information;
the processing circuitry acquires a positional relationship of each of the pieces of the actual measurement data in a corresponding one of the display shapes indicating the respective pieces of the normal information;
the processing circuitry projects each of the pieces of the actual measurement data to the dimensionless space on a basis of the positional relationship between a corresponding one of the display shapes indicating the respective pieces of the normal information of the equipment and a corresponding one of the pieces of the actual measurement data; and
the processing circuitry estimates the distribution of the state of the equipment on a basis of the pieces of the actual measurement data projected to the dimensionless space.

4. The equipment state monitoring device according to claim 1, wherein the processing circuitry calculates, as information indicating the positional relationship of each of the pieces of the actual measurement data in the corresponding one of the display shapes indicating the respective pieces of the normal information, a distance between a center point of the corresponding one of the display shapes indicating the respective pieces of the normal information and the corresponding one of the pieces of the actual measurement data, and an angle formed by a straight line passing through the center point and the corresponding one of the pieces of the actual measurement data and a side of the corresponding one of the display shapes indicating the respective pieces of the normal information, the straight line intersecting the side.

5. The equipment state monitoring device according to claim 3, wherein the processing circuitry calculates, as information indicating the positional relationship of each of the pieces of the actual measurement data in the corresponding one of the display shapes indicating the respective pieces of the normal information, a distance between a center point of the corresponding one of the display shapes indicating the respective pieces of the normal information and the corresponding one of the pieces of the actual measurement data, and an angle formed by a straight line passing through the center point and the corresponding one of the pieces of the actual measurement data and a side of the corresponding one of the display shapes indicating the respective pieces of the normal information, the straight line intersecting the side.

6. The equipment state monitoring device according to claim 1, wherein the processing circuitry includes a learner to estimate, using a position of a display shape indicating the normal information in the dimensionless space as an input, a position of data indicating a normal state value of the equipment in the dimensionless space, and corrects the actual measurement data using the position of the data estimated by the learner in such a manner as to reduce a deviation from an origin of the dimensionless space.

7. The equipment state monitoring device according to claim 2, wherein the processing circuitry includes a learner to estimate, using a position of a display shape indicating the normal information in the dimensionless space as an input, a position of data indicating a normal state value of the equipment in the dimensionless space, and corrects the actual measurement data using the position of the data estimated by the learner in such a manner as to reduce a deviation from an origin of the dimensionless space.

8. The equipment state monitoring device according to claim 3, wherein the processing circuitry includes a learner to estimate, using a position of a display shape indicating the normal information in the dimensionless space as an input, a position of data indicating a normal state value of the equipment in the dimensionless space, and corrects the actual measurement data using the position of the data estimated by the learner in such a manner as to reduce a deviation from an origin of the dimensionless space.

9. An equipment state monitoring method, comprising:
acquiring pieces of actual measurement data each indicating a state value of equipment;
acquiring pieces of normal information each indicating a normal state of the equipment;
acquiring a positional relationship of each of the pieces of the actual measurement data in a corresponding one of display shapes indicating the respective pieces of the normal information of the equipment;
projecting each of the pieces of the actual measurement data to a dimensionless space on a basis of the positional relationship between a corresponding one of the display shapes indicating the respective pieces of the normal information and a corresponding one of the pieces of the actual measurement data, the dimensionless space being a space in which the display shapes indicating the respective pieces of the normal information of the equipment are represented by a common shape;
correcting both or one of the normal information in the dimensionless space and the actual measurement data in the dimensionless space on a basis of a relationship between actual measurement data indicating the normal state of the equipment in the dimensionless space and a display shape indicating the normal information in the dimensionless space; and
estimating a distribution of a state of the equipment on a basis of the pieces of the actual measurement data projected to the dimensionless space.

* * * * *